Oct. 15, 1946.   M. C. GAUTHIER   2,409,484
SUPPORTING APPARATUS
Filed Sept. 16, 1944    2 Sheets-Sheet 1
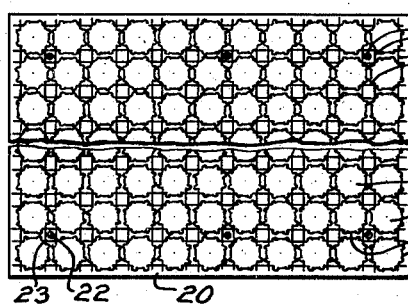
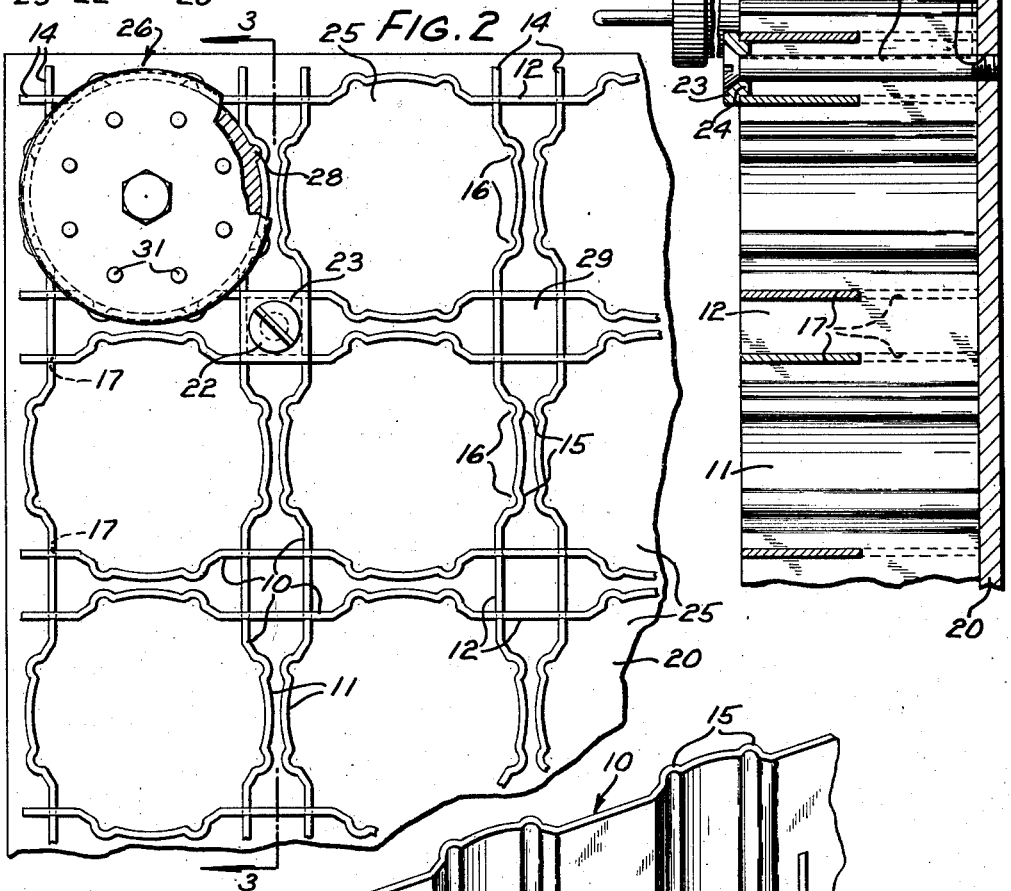
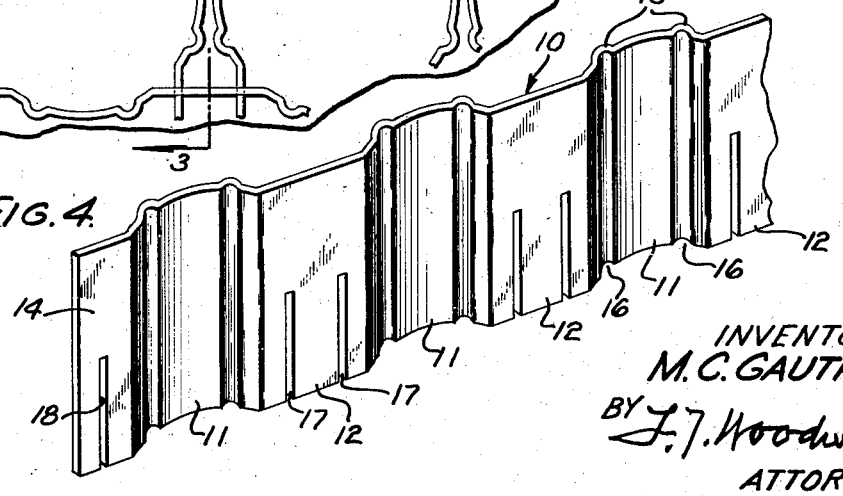
INVENTOR
M. C. GAUTHIER
BY F. J. Woodward
ATTORNEY

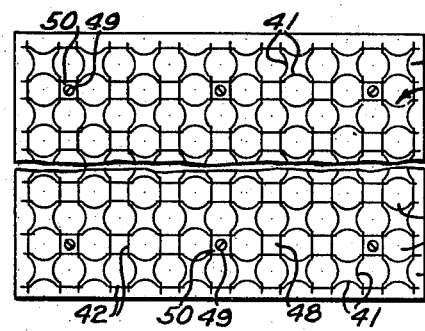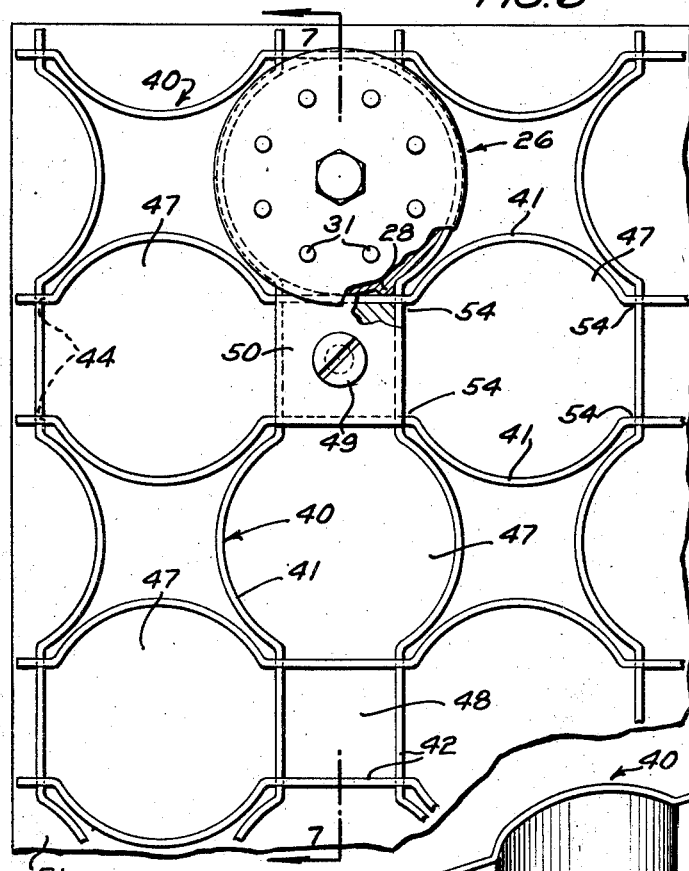

Patented Oct. 15, 1946

2,409,484

UNITED STATES PATENT OFFICE 2,409,484

SUPPORTING APPARATUS

Marcel C. Gauthier, Montclair, N. J., assignor to Western Electric Company, Incorporated, New York, N. Y., a corporation of New York Application September 16, 1944, Serial No. 554,477

3 Claims. (Cl. 211—72)

This invention relates to supporting apparatus, and more particularly to supporting panels for electrical units.

In certain forms of communication equipment, electrical units such as balancing coils, are to be assembled in large groups on a panel. Certain of these coils are approximately six inches in length and weigh between one-half and three-quarters of a pound. Furthermore, the coils are to be connected to each other through the aid of terminal strips, conductors or the like, and it is important that the coils be supported against movement relative to each other to eliminate any possibility of the electrical connections, through the terminals and conductors, being broken or otherwise disturbed.

An object of the invention is to provide a supporting apparatus which is simple in structure, easily assembled and rigid in its support of a plurality of articles.

With this and other objects in view, the invention comprises a multiplicity of like elements notched for interfitting engagement with each other and formed so that when assembled, adjacent article receiving pockets are provided, the invention also including a panel upon which the assembled elements may be mounted.

Other objects and advantages will be apparent from the following detailed description when considered in conjunction with the accompanying drawings, wherein Fig. 1 is a fragmentary front elevational view of one species of the supporting apparatus;

Fig. 2 is a fragmentary front elevational view of the supporting apparatus shown approximately full size;

Fig. 3 is a fragmentary sectional view taken along the line 3—3 of Fig. 2;

Fig. 4 is a fragmentary perspective view of one of the elements of the apparatus shown in Figs. 1, 2 and 3;

Fig. 5 is a fragmentary front elevational view of another species of the invention;

Fig. 6 is a fragmentary full size front elevational view of the structure shown in Fig. 5;

Fig. 7 is a fragmentary sectional view taken along the line 7—7 of Fig. 6, and

Fig. 8 is a fragmentary perspective view of one of the elements of the supporting apparatus shown in Figs. 5, 6 and 7.

Referring now to the embodiment illustrated in Figs. 1 to 4 inclusive, the structure is composed of a multiplicity of like elements 10 of the general contour shown in Fig. 4. The element 10 is formed of a suitable resilient material, preferably metal, and includes arcuate portions 11 with intermediate straight portions 12 and the shorter end portions 14. The arcuate portions have spaced outwardly formed portions 15 providing lateral grooves 16 for a purpose hereinafter described. The intermediate straight portions 12 have spaced slots 17 extending approximately half their width to serve as means for interfitting the elements in assembly. The end members 14 are also slotted, as at 18, for the same purpose.

A panel 20 also formed of a suitable material, such as metal, is provided with a plurality of spaced threaded apertures 21 to receive mounting screws 22, the latter serving in combination with washers 23 to mount the assembled elements 10 upon the panel 20. It will be noted that the washers 23 shown in Figs. 2 and 3 are square in general contour and are provided with reduced portions 24 for interfitting engagement with the adjacent portions of the elements 10.

Upon considering the assembling steps for the elements 10, let it be assumed that the vertical elements shown in Fig. 2 are positioned with their slots 17 and 18 upwardly, so that the horizontally disposed elements, with their corresponding slots 17 and 18 extending downwardly, may be assembled with the vertical elements to complete the structure in Fig. 2. As a result of this assembly, four of the arcuate portions 11 combined complete a pocket 25 for an article, indicated generally at 26. Each pocket is circular in general contour and is provided with eight grooves 16, each adapted to receive a locating lug 28 on the outer wall of the article 26. When the elements 10 are thus assembled and the arcuate portions 11 complete the pockets 25, the end portions 14 will be interlocked, either with other end portions of adjacent elements or with straight portions 12 thereof. Furthermore, the straight portions 11 provide apertures 29 which are square in cross-section, certain of these apertures aligning with the threaded apertures 21 of the panel 20. Through the aid of the mounted screws 22 and their washers 24, the assembled elements may thus be mounted upon the panel and the supporting apparatus is completed.

The article 26 is an electrical unit, such as a coil enclosed in a container 30 which carries the lug 28, houses portions of the coil structure and is filled with an insulating material or sealing compound. Due to the size of the article or coil and the weight thereof, it is necessary that the supporting means therefor be of sufficient strength to hold each of the coils against movement to eliminate possible disturbance or breakage of electrical connections which are made with their terminals 31. It is also important that during the assembly of the coils they may be disposed at varied positions with respect to each other, so that the desired electrical connections therebetween may be more readily made. Through the aid of the grooves 16, each coil may be disposed in any one of eight different positions. The importance of the holding of the coils against displacement has been emphasized. Another important feature is to assure holding of the coils in their respective pockets. This is realized through the resilient nature of the material of which the elements 10 are formed. Each of the four arcuate portions which jointly form each of the pockets 25 cooperate in gripping the coil or article and thus hold it against displacement.

The species illustrated in Figs. 5 to 8 inclusive is very similar to that shown in Figs. 1 to 4 inclusive with the exception of the group positioning of the pockets and the presence of the grooves 16. The structure shown in Figs. 5, 6 and 7 includes a multiplicity of elements 40 formed of suitable material, such as metal and including spaced arcuate portions 41 with intermediate straight portions 42 and end portions 43. The straight portions 42 are provided with spaced slots 44 extending approximately half the width of the element, similar slots 45 being formed in the end portions 43. The elements 40 are assembled in substantially the same manner as the elements 10 are assembled, the elements 40, however, forming pockets 47 of the arrangement illustrated in Fig. 6. Intermediate square pockets or apertures 48 are also formed through the grouping of the straight portions 42 and in certain of these pockets, mounting screws 49 and their cooperating square washers 40 are disposed for mounting the assembled elements upon a panel 51, the latter having threaded apertures 52 therein for receiving the mounting screws 49.

Attention is directed to the contours of the pockets 47. These pockets are formed mainly by two of the arcuate portions 41 of companion elements 40, the intermediate straight portions of the pockets cooperating to form locating grooves 54 into which the locating lug 28 of the coil or article may be disposed. In this arrangement, there are four different positions into which the coil may be disposed. The arcuate portions of the elements forming the pockets function to resiliently hold their respective coils in place and through the interlocking structures of the elements, firm supports are provided to hold the coils against possible relative movement.

Although specific improvements of the invention have been shown and described, it will be understood that they are but illustrative and that various modifications may be made therein without departing from the scope and spirit of this invention as defined by the appended claims.

What is claimed is:

1. An apparatus adapted to support cylindrical articles having outwardly projecting lugs, the apparatus comprising a panel, like elements formed of strips of resilient material, all portions of which are disposed at right angles with respect to the panel, with spaced straight portions notched for interlocking assembly of pairs of the elements disposed at right angles to each other, intermediate arcuate portions forming substantially cylindrical pockets for the articles and grooves at a plurality of positions for the lugs of the articles, and means to secure the assembled elements to the panel in a unitary structure.

2. An apparatus adapted to support cylindical articles having outwardly projecting lugs, the apparatus comprising a panel, like elements formed of strips of resilient material, all portions of which are disposed at right angles with respect to the panel, with spaced straight portions notched for interlocking assembly of pairs of the elements disposed at right angles to each other, intermediate arcuate portions forming substantially cylindrical pockets for the articles and grooves at a plurality of positions for the lugs of the articles, and means extending between selected groups of the straight portions to secure the assembled elements to the panel in a unitary structure.

3. An apparatus adapted to support cylindrical articles having outwardly projecting lugs, the apparatus comprising a panel, like elements formed of strips of resilient material, all portions of which are disposed at right angles with respect to the panel, with spaced straight portions notched for interlocking assembly of pairs of the elements disposed at right angles to each other, intermediate arcuate portions forming substantially cylindrical pockets for the articles and grooves at a plurality of positions for the lugs of the articles, means extending between selected groups of straight portions and engaging all the elements of the selected groups to secure the assembled elements to the panel in a unitary structure.

MARCEL C. GAUTHIER.